United States Patent [19]
Wollenhaupt et al.

[11] 3,729,083
[45] Apr. 24, 1973

[54] BUILDING BLOCK SYSTEM FOR MACHINE TOOLS AND PRODUCTION LINES

[76] Inventors: Jakob Wollenhaupt; Agnes Wollenhaupt nee Stang, both of Inn Langen Bruch 33, Cologne-Bruck, Germany

[22] Filed: July 16, 1971

[21] Appl. No.: 163,260

[30] Foreign Application Priority Data

July 20, 1970 Germany..................P 20 35 874.1

[52] U.S. Cl....................198/19, 198/102, 29/33 P, 29/563
[51] Int. Cl..............................................B23q 5/22
[58] Field of Search..............................198/19, 102; 29/33 P, 563

[56] References Cited

UNITED STATES PATENTS

| | | | |
|---|---|---|---|
| 3,061,064 | 11/1962 | Hameister | 29/33 P |
| 3,155,217 | 11/1964 | Cross | 198/19 |
| 3,271,840 | 9/1966 | Solski | 29/33 P |
| 3,280,659 | 10/1966 | Allen | 29/563 |
| 3,543,392 | 12/1970 | Perry | 29/563 |

*Primary Examiner*—Richard E. Aegerter
*Attorney*—Walter Becker

[57] ABSTRACT

A line for performing work operations on work members in successive stations, with each station having therein a unit on which is mounted a carriage moveable parallel to the line of working stations and having an intermediate working position on the base of the respective unit. Work supports are provided which are slidable on the carriages parallel to the sliding direction of the carriages and which can be locked to the carriages in intermediate working positions.

When a carriage is moved to either of two end positions on the respective base it is adjacent the carriage on the next adjacent unit when the carriage on the next adjacent unit is moved to its end position nearest the first mentioned unit. In this juxtaposed position the work supports can be transferred from each carriage to a carriage next adjacent thereto for a further work operation.

27 Claims, 14 Drawing Figures

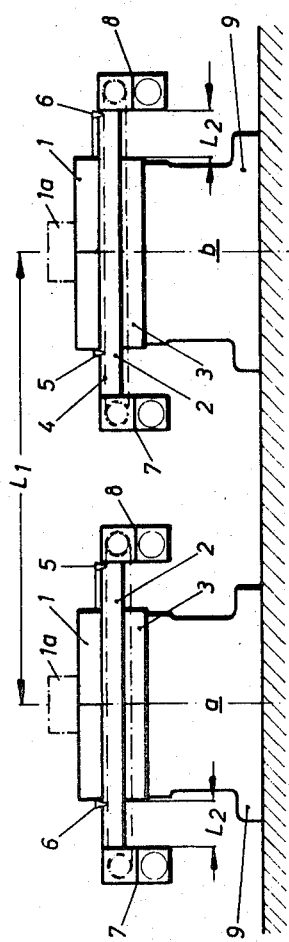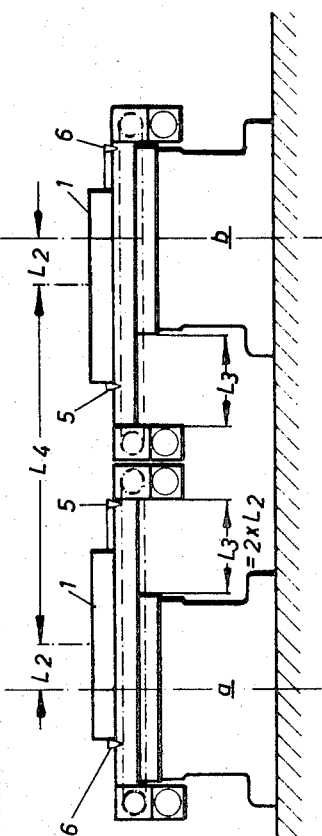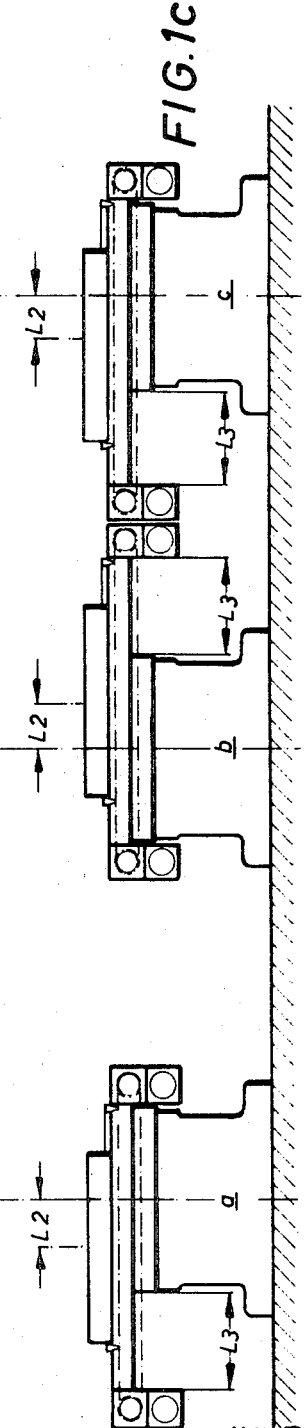

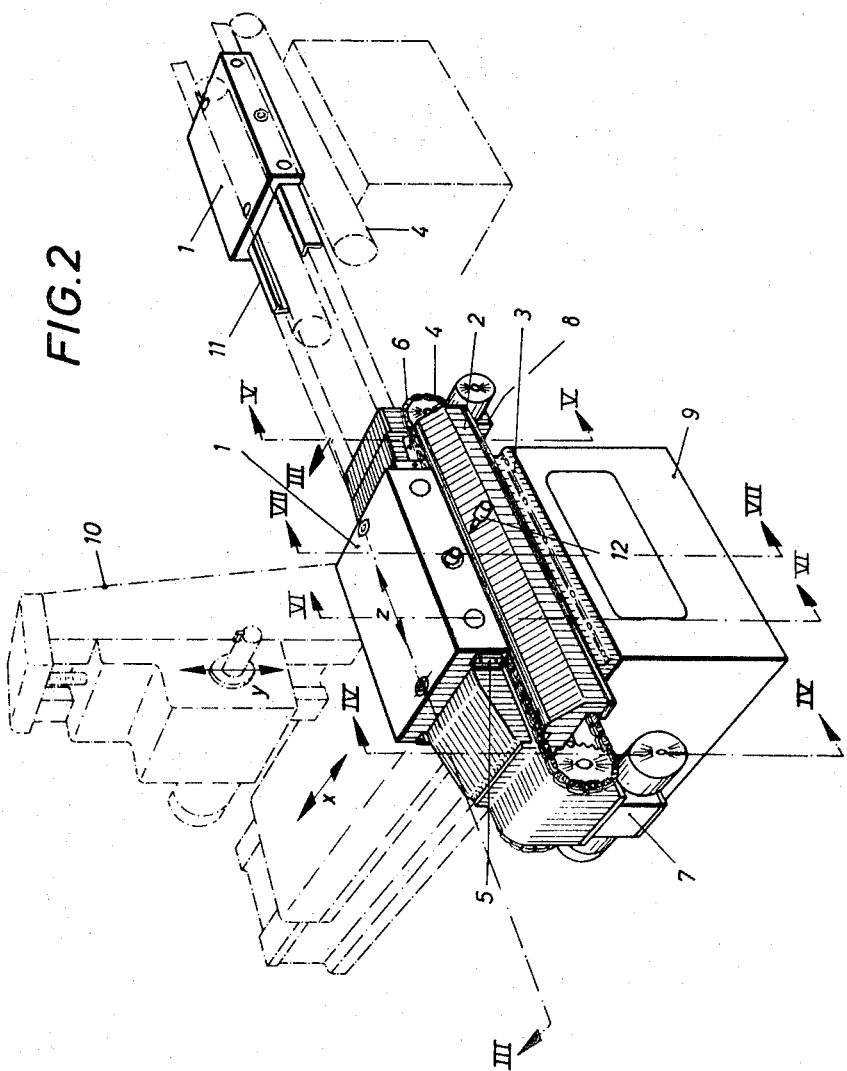

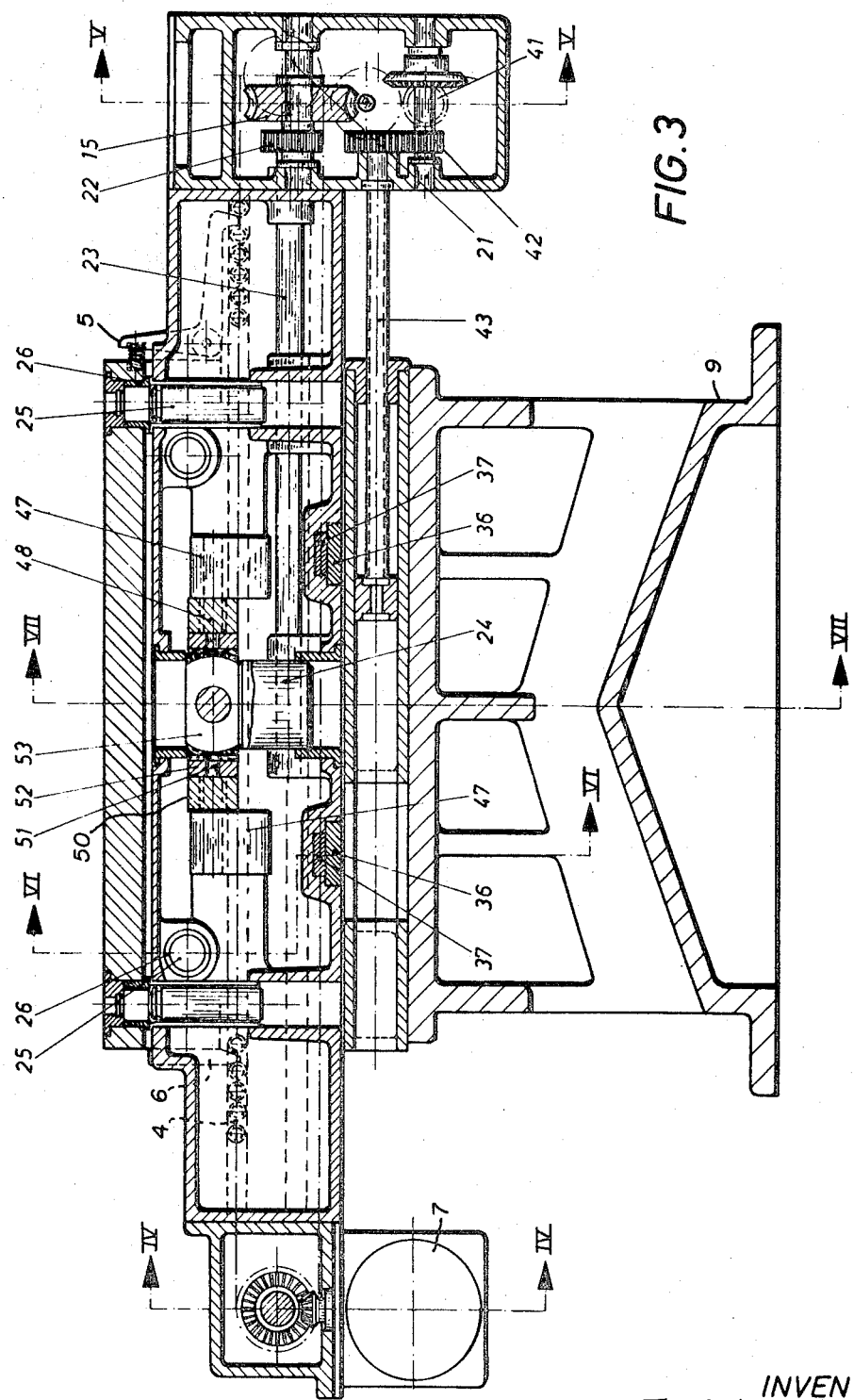

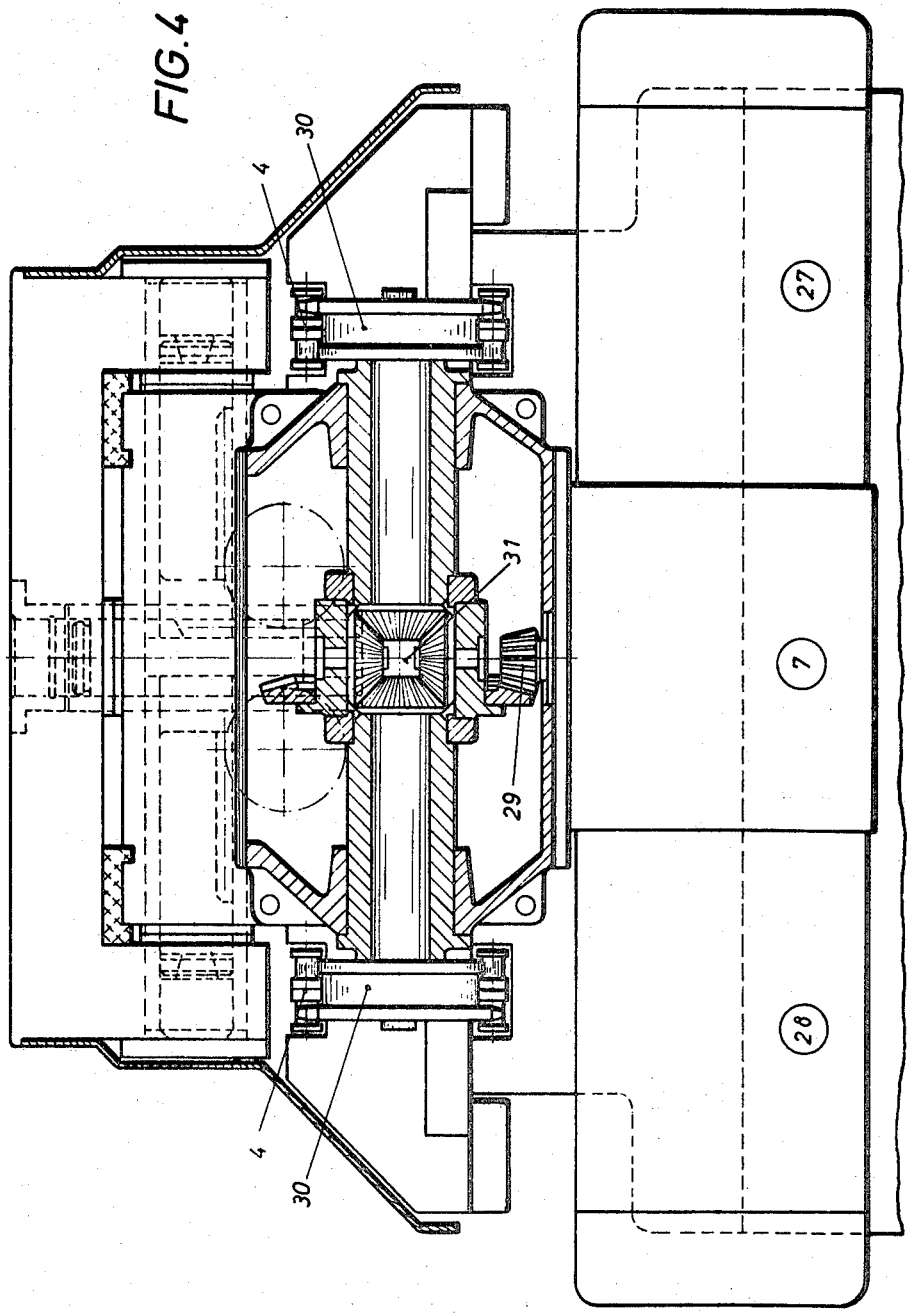

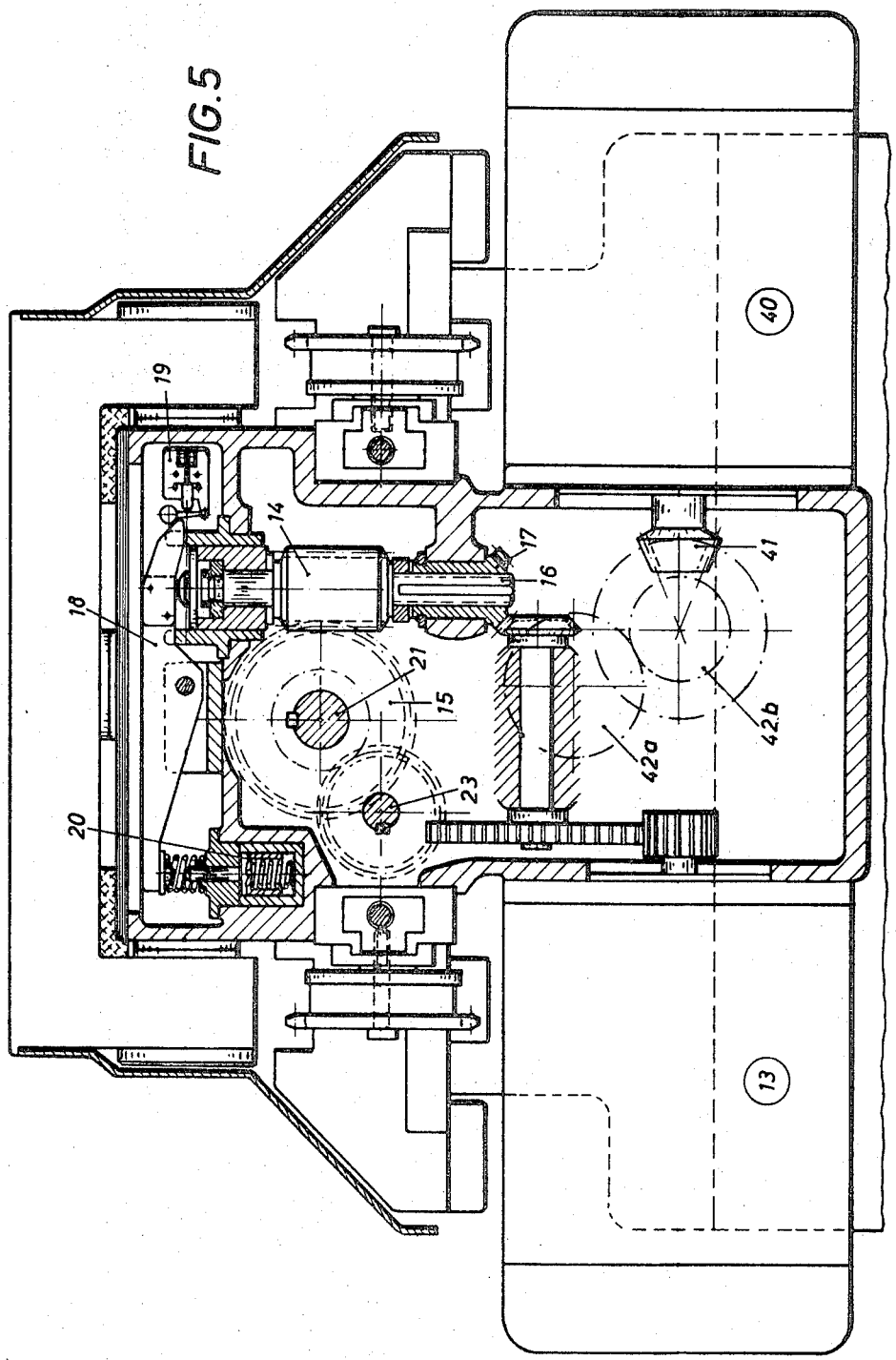

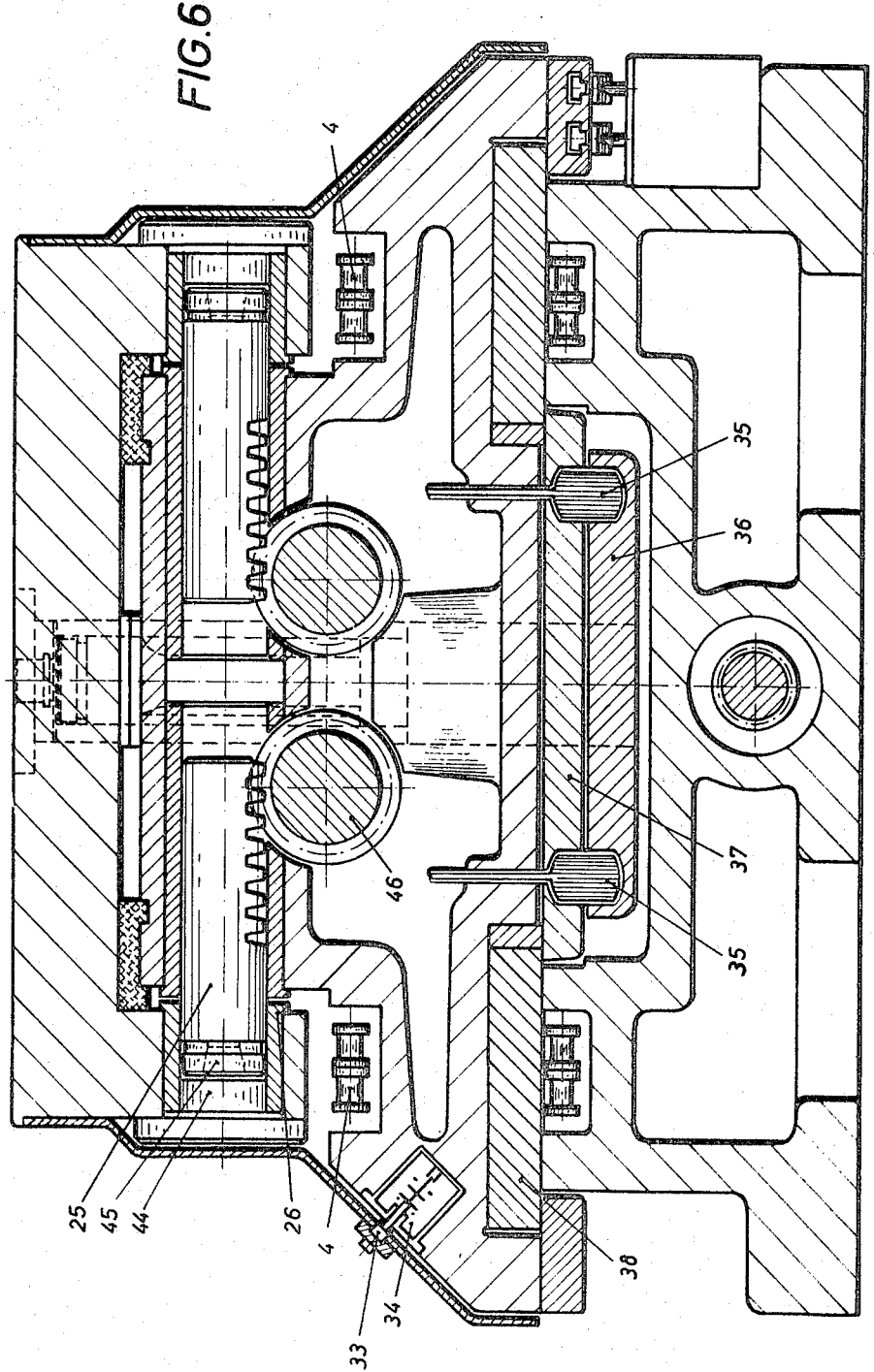

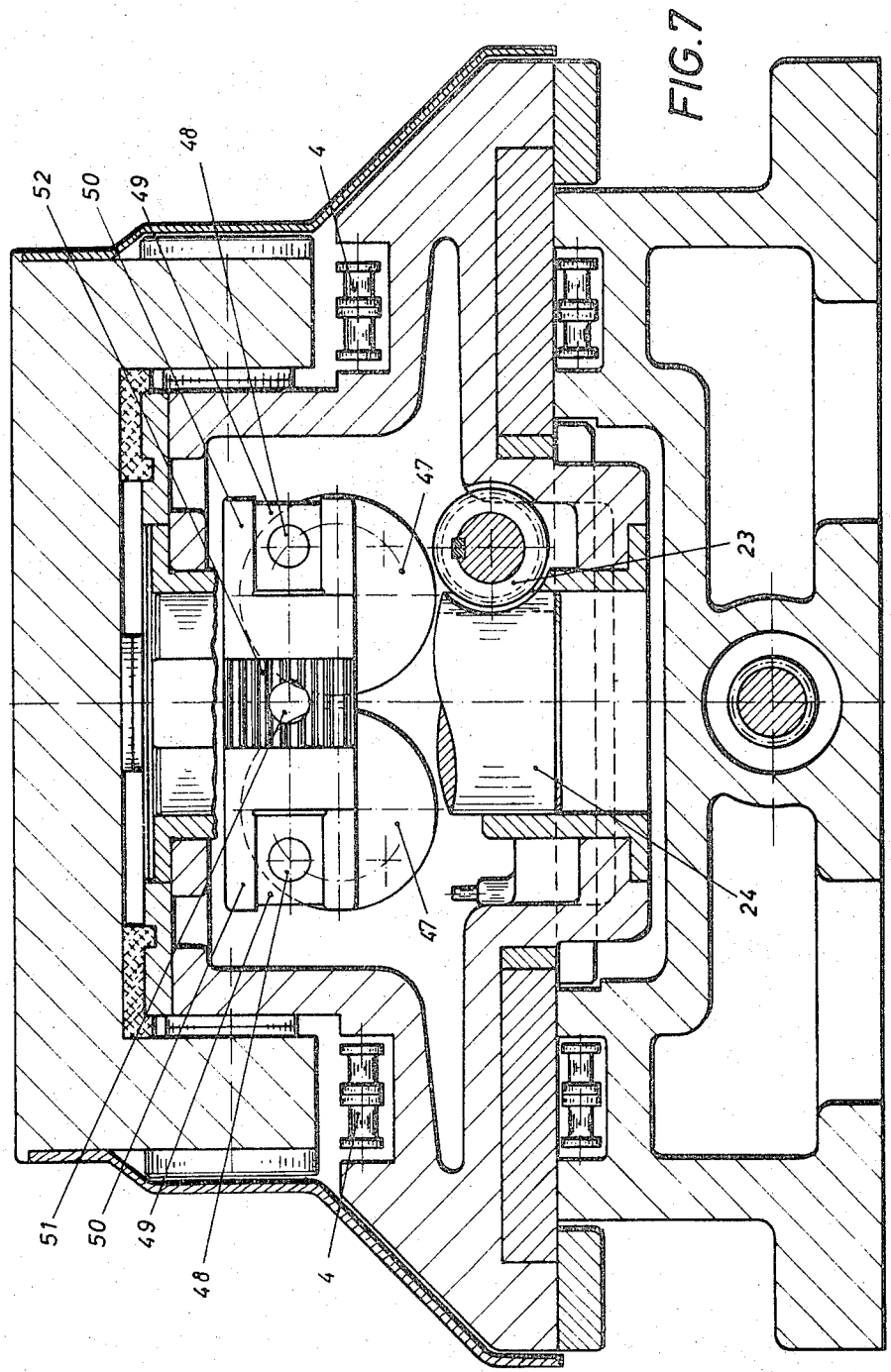

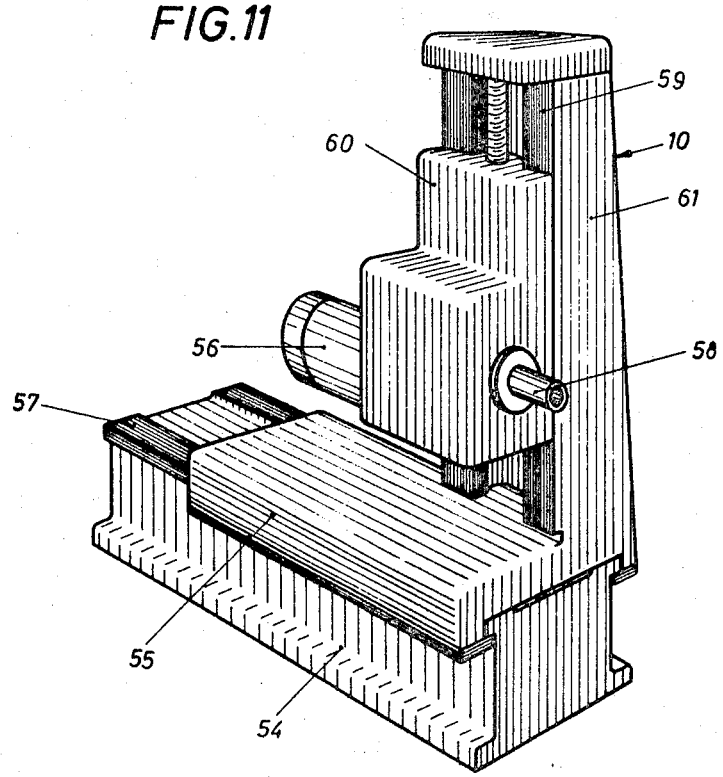

BUILDING BLOCK SYSTEM FOR MACHINE TOOLS AND PRODUCTION LINES

The present invention relates to a building block system for machine tools and production lines, especially for transfer machines of the chip removing type.

A transfer machine tool is set, each tensioning for a certain machining problem, and is composed of working units which are assembled in conformity with the building block system. After the desired number of workpieces has been finished for which the transfer machine has been built, it is necessary completely to assemble the machine in order to assemble the same in a different manner for different machining operations. In other words, for each machining problem, a new machine has to be assembled from building block units.

It is an object of the present invention to provide a transfer machine composed of building block units, which can be changed over for other working operations without disassembling and reassembling the machine.

Transfer machines have become known according to which at the individual working stations there are provided three dimensionally adjustable spindle units which as to their construction correspond to heretofore known horizontal boring mills. The workpieces are firmly connected or fixed to boards (Paletten) which have to be transported from one working station to another working station which at each working station must be arrestable and precisely lockable and braceable. The movement of the boards from one working station to another working station appears at a certain rhythm and is brought about by a transfer device.

It is another object of this invention to provide a transfer machine tool which will permit a manifold adjustment for different working problems in a minimum of time and in a very simple manner. In this connection, it is a further object of the invention so to design the transfer machine that a transporting device, a positioning device and a locking device for the board must be possible with a precise adjustment in one of the three coordinates, and it is a further object of the invention so to arrange said transfer machine that it will be possible to correct the position of the respective working spindle.

It is still another object of this invention to keep to a minimum the place requirement for the unit from which the transfer tool is composed, in spite of the manifold useability of the transfer machine tool. Still another object of this invention consists in so to design the units according to the invention that they can be applied for transfer machines with different rhythm intervals. It is still another object of this invention so to design the transfer machine according to the invention that the rhythm distances or intervals can quickly be changed and that the new units without special redesign can be inserted in heretofore known systems of building block units as far as they are defined by standards while the units and building elements making up the transfer machine must lend themselves to mass fabrication and thereby will be economical from the cost standpoint.

These and other objects and advantages of the invention will appear more clearly from the following specification, in connection with the accompanying drawings, in which:

FIGS. 1a, 1b, and 1c, respectively illustrate the workpiece carrier units in different possible positions.

FIG. 2 is an isometric view of the workpiece carrier unit.

FIG. 3 represents a longitudinal section through the workpiece carrier unit, said section being taken along the line III—III of FIG. 2.

FIG. 4 represents a section taken along the line IV—IV of FIG. 3.

FIG. 5 is a section taken along the line V—V of FIG. 3.

FIG. 6 is a section taken along the line VI—VI of FIG. 3.

FIG. 7 is a section taken along the line VII—VII of FIG. 3.

Figure 10:
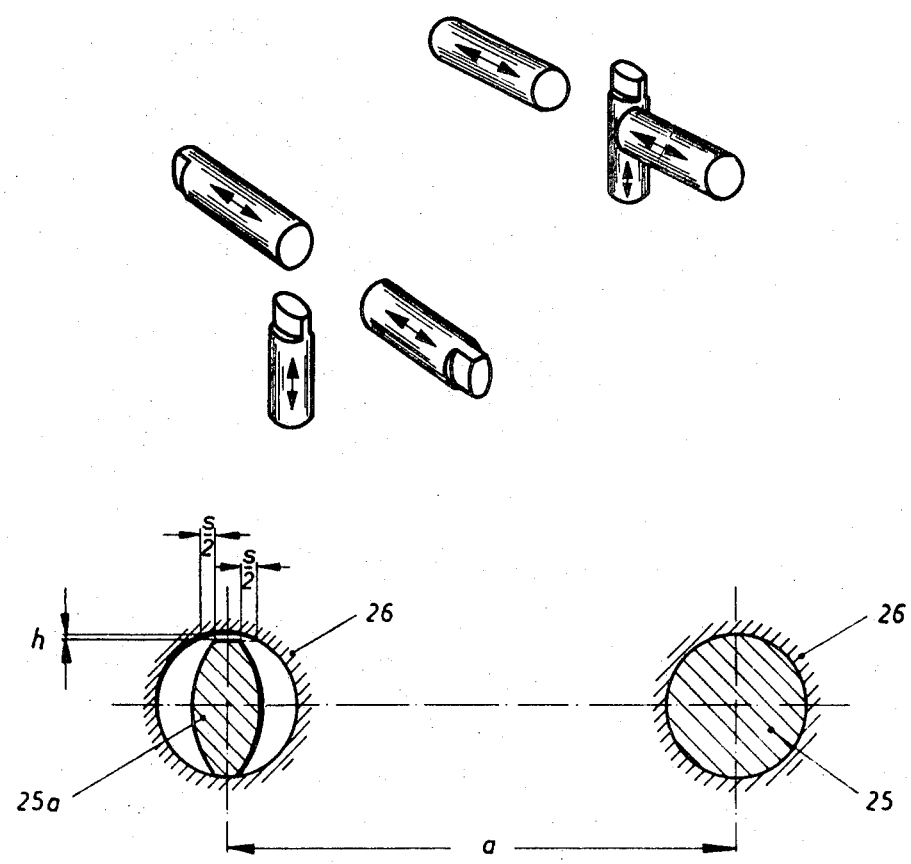

FIG. 10 diagrammatically illustrates by way of an isometric view a locking bolt according to the invention.

FIG. 11 is an isometric view of a working unit according to the invention.

The building block system for machine tools and assembly lines according to the present invention is characterized primarily in that the tool is arranged in a working unit which permits the adjustment as to height of the working spindle and also permits an adjustment in the feeding direction, said working unit comprising a workpiece carrier unit including a carriage with carriage guiding means, said carriage carrying a board. The said workpiece carrier unit comprises transverse adjusting means for the board, the transporting device for said board from one working station to another working station, the arresting and locking mechanism for the board and for the carriage, and the dimensional correcting system of the carriage position and board.

According to a specific embodiment of the invention, the board or support carrying the workpiece can be precisely locked on the carriage while the carriage in the board transporting direction is precisely guided on carriage guiding means and can be adjusted in a fine manner and locked, the transporting device and all drives being carried by said carriage.

According to a further embodiment of the invention, the transporting means for the board or support comprises an endless chain. In view of this design, there exists the possibility of assembling the workpiece units and each working station of the transfer machine or assembly line completely independently of the position of the other stations.

The transporting chain permits the transfer of the workpiece tightened to the board from one station to the other station.

Moreover, with the embodiment according to the transporting means in the form of an endless chain there exists the advantage that the transporting device is independent of the framework and that no precise positioning on said framework is required.

The positioning, arresting and locking is in accordance with a further development of the invention effected on the finely adjustable carriage which forms the lower structure of the workpiece unit. More specifically, this is effected by means of almost sharp-edged ground index bolts which are introduced into corresponding bushings in the bore in such a way that the same will be blocked in all degrees of freedom.

For correcting the precise positioning of the carriage position, an adjustable fixed point is arranged on the workpiece carrier unit, and more specifically, on the board or support, which fixed point is scanned by an electronic or optical feeler mounted on the framework. Corresponding to the magnitude of the deviation from the intended dimensions, impulses are emitted to the adjusting device until the rated measure has been realized.

Inasmuch as the workpiece carrier unit according to the invention comprises not only the possibility of a transverse adjustment, but also the transporting device, the positioning and the locking and the collection of dimensions, whereas the working unit contains only the adjustment as to height for the feeding, it is possible to design the working unit simple, strong, short and precise, while said working unit requires a considerably less space than heretofore known horizontal boring mills.

The spindle units will, in the workpiece transporting device, require less space whereby the assembly line can be made as short as possible.

The workpiece carrier unit is independent not only from the framework, but also from the neighborhood stations and from the working units. As a result thereof, the unit can be inserted into transfer machines of various types.

Referring now to the drawings in detail, in FIG. 1a there are shown two frame units a and b of a heretofore known design on which one carriage 2 each is arranged by means of a carriage guiding means 3. Longitudinally arranged on carriage 2 are supports (Paletten) having centrally arranged thereon workpieces 1a.

According to FIG. 1a, the two units are spaced from center to center by a distance $L_1$. The same distance also exists from center workpiece to center workpiece.

In view of the displaceability of the carriages 2 on the carriage guiding means 3 of the two workpiece carrier units, the boards 1 locked on the carriage and thus the workpieces 1a are spaced from each other by each twice the amount $L_2$ or are moved by this amount toward each other.

If, for instance $L_1$ equals 1,200 millimeters and the displaceable $L_2$ toward each side equals 200 millimeters, the workpiece distance $L_4$ can be varied within the range of 1,200 minus 400 equals 800 millimeters.

FIG. 1a shows the position of two carriages 2 of two adjacent workpiece carrier units occupying their central position.

The transporting chain 4 which moves the board 1 out of its central position rotates within the workpiece carrier unit. It is provided with followers 5 and 6. The transporting chain 4 can move the support 1 out of the range of its central position to such an extent that the follower 5 reaches the transport chain of the adjacent unit and will then be taken along by the latter.

FIG. 1b shows the carriage position of two adjacent units with the carriage moved out farthest, and more specifically, when the two adjacent units have been moved toward each other. In the unit a, the carriage 2 is displaced toward the right by a distance $L_3 = 2 \times L_2$, and the unit b is moved toward the left to the same extent.

The drive of the transport chain 4, in other words, the movement of the carriage 2 will then be effected by a feeding unit 7 which comprises a feed motor, a fast traverse motor 27 and a feed transmission 28 which means that it is equipped with fast and slow speed mechanism and is arranged at one end face of the carriage 2.

The oppositely located end face is provided with a drive unit 8 comprising the blocking motor 13, the adjuster 40 and a transmission.

The frame units 9 may be produced according to German standards DIN 69 512.

According to FIG. 1c, three successive workpiece carrier units are shown while on the frame a the carriage 2 has reached its outermost position toward the left, whereas with the two successive units b and c the carriages have been moved to their outermost position in the direction toward each other.

FIG. 2 shows a perspective view of the workpiece carrier unit while a neighborhood unit is indicated at the right-hand thereof.

Also, in this instance, the working unit 10 pertaining to the workpiece carrier unit is indicated. By means of the working spindle unit 10 the height adjustment of the working spindle provided with an arrow c and the adjustment in the direction of the feed (X-axis) is effected. The board 1 is again intended for tensioning the workpiece which is transported by one endless chain while the drive of said chain is effected by feeding transmission 7. The board 1 is arranged on a carriage 2 which rests on a carriage guiding means 3 which latter is arranged on the frame unit 9. As will be seen from FIG. 2, the board guiding means 11 has been shown isometrically in the neighborhood station. It consists of ordinary rails. Inasmuch as the individual units are adapted to be assembled independently of each other, no precise guiding of the said boards will be necessary. The rails consist of the rail profile iron, as for instance, angle irons or U-shaped irons which are arranged between the stations and, if desired, may be covered with synthetic material, for instance nylon, for increasing the sliding properties.

FIG. 2 diagrammatically illustrates the feeler mechanism 12 for controlling the measurement control which will be described further below in detail. The deviation from the rated value as ascertained by such feeler mechanism is by means of electric or electronic means, known per se, converted into pulses which are conveyed to the driving unit 8 which may, for instance, be equipped with a stepping motor.

The remaining figures will be described in connection with the operation of a workpiece carrier unit. In this connection, it may be assumed that a machining operation has been completed and that a new one has to be set. The completion of the working operation is effected by the working unit 10 illustrated in FIG. 11 and comprising the working spindle. The working unit comprises, mostly on the left-hand side (not illustrated) a cam strip with cams which are arranged in conformity with the strokes required for the individual working operations and which by movements of the carriage actuate corresponding limit switches thereby controlling the working operation. By means of this arrangement, also the command for unlatching the support or board will be conveyed.

For purposes of locking and unlocking or unlatching, there is provided a locking motor 13 (FIG. 5) which is put into action by an electric pulse and which through the intervention of transmission gears actuates worm 14 and thereby worm wheel 15. The actuation of the worm 14 is effected by a longitudinally displaceable splined shaft 16 in the bevel gear 17 whereby the worm 14 will be able as traveling worm to carry out control movements. In locked position, worm 14 has traveled upwardly and through lever 18 has actuated the contact switch 19 and the hydraulic clamping cylinder 20.

When unlocked, the worm 14 travels downwardly and by means of a lever 18 actuates the switch 19 and frees the hydraulic clamping cylinder 20. Similar to the heretofore known arrangement of hydraulic operable four-wheel brakes of motor vehicles, the locking of the carriage is released simultaneously at a plurality of points.

The locking motor 13 and worm 14 will, after completion of the displacement operation, move further and by means of shaft 21 will pull downwardly the gear pair 22 and shaft 23 (FIGS. 3 and 5) and also the gear rack bolt 24. Bolt 24 will, by means of an equalizing mechanism, pull six index bolts 25 out of the corresponding receiving bushings 26, as illustrated in FIGS. 6 and 3. This operation is completed by a short time switch mechanism of a known structure which is mounted in a control cabinet on a control board. The limit switch contacts may be arranged so that they can be switched off.

After the unlocking operation has been completed, the driving unit 7 for the support transport is switched on and, more specifically, the shaft traverse motor 27 and also the feed motor 28 (FIG. 4). Through the bevel gear 29, the movement of the sprocket wheels 30 on which the chains 4 are located is initiated through the differential gear transmission 31 in a manner similar to a motor vehicle drive. The differential gear transmission 31 serves the uniform drive of both chains 4. Chains 4 will, by means of the followers 5 and 6, carry along the supports 1 in the transporting direction (see FIGS. 1 and 2).

When the follower 6 during the transport action leaves the range of engagement of chains 4, the resilient follower 5 is already in engagement with the adjacent, i.e. the next following unit, or with a corresponding transporting device. The movement of the support 1 will therefore be continued until a cam 33 moving together with the support 1 will, by means of a limit switch 34 (FIG. 6) arranged on the carriage 2 first switch off the fast traverse motor 27. Motor 27 is equipped with an electromagnetic brake and thereby after a short stroke just prior to the actual stopping will stop. The support 1 now continues moving on at low feeding speed until the cam reaches a second limit switch (not shown) which stops the movement at a precisely predetermined point.

At this precisely fixed point, the receiving bushings 26 face the corresponding index bolts 25 at high precision. In view of the switch-off pulse of the feed motor 28, the locking motor 13 is switched on, which motor through the intervention of rack bolts 24 moves the index bolts 25 into the bushings 26 (FIGS. 3 and 7). This displacement movement is completed by fixed abutments on or in the bolts.

The traveling worm 14 then moves upwardly while actuating the limit switch 19 (FIG. 5) which shows a section through the adjusting and locking unit 1 (FIGS. 1 and 2). By means of lever 18, the hydraulic piston is pressed downwardly in the cylinder 20. The thereby occurring oil pressure is conveyed to expandable cylindrical bodies 35 (see FIG. 6 likewise illustrating a section through the locking elements, said section being taken along the line VI—VI of FIG. 3).

The cylindrical bodies 35 are located firmly in the plate 36 and press the movable clamping plate 37 (see FIGS. 3 and 6) upwardly against the bottom surface of the carriage guiding strips 38 (FIG. 6). Instead of the expandable bodies 35, also hydraulic brake cylinders of motor vehicle brakes may be employed.

Figure 8:
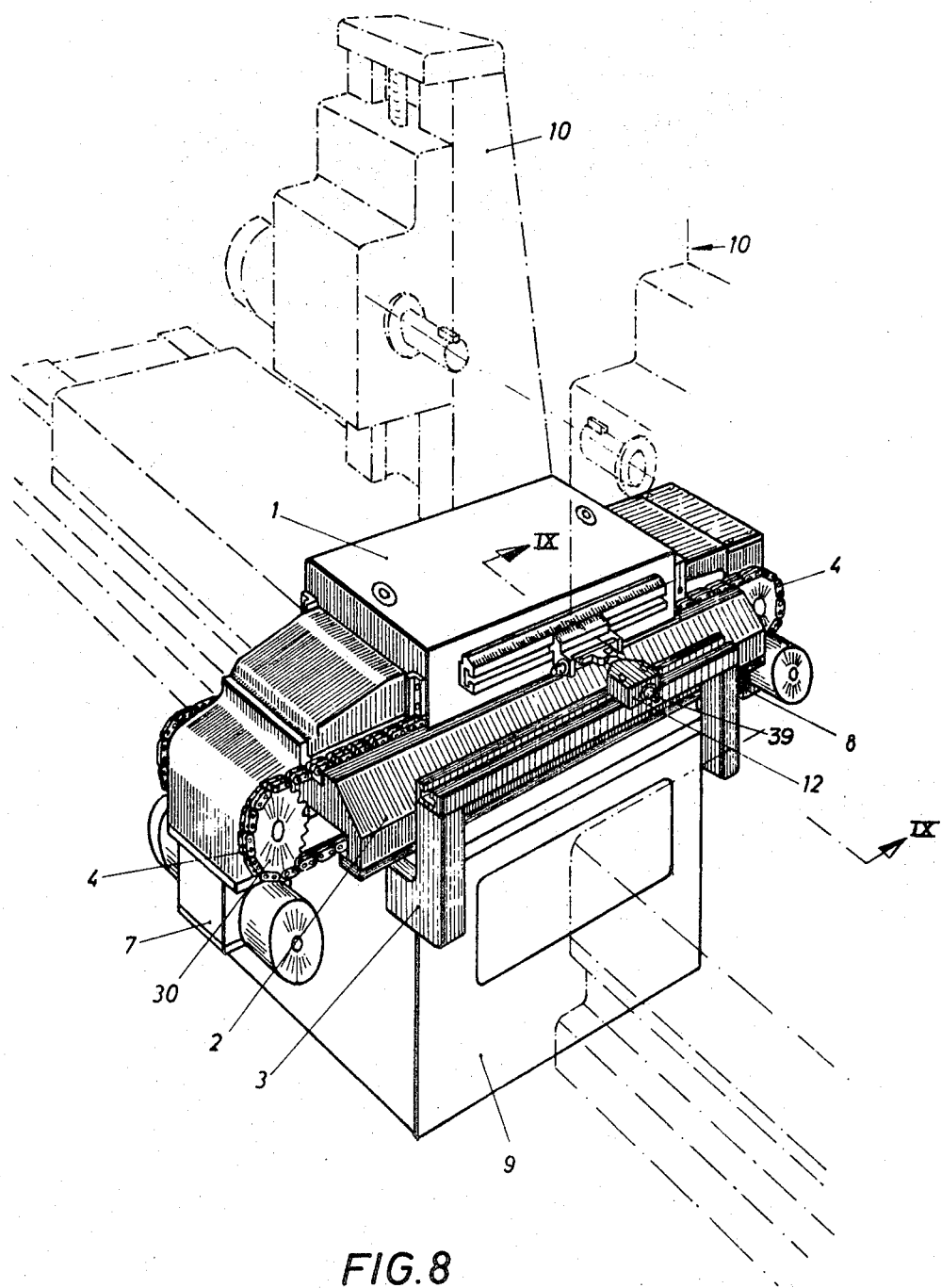
FIG. 8 shows the workpiece carrier unit of FIG. 2, but with a special design for the dimension correction of the carriage.
Figure 9:
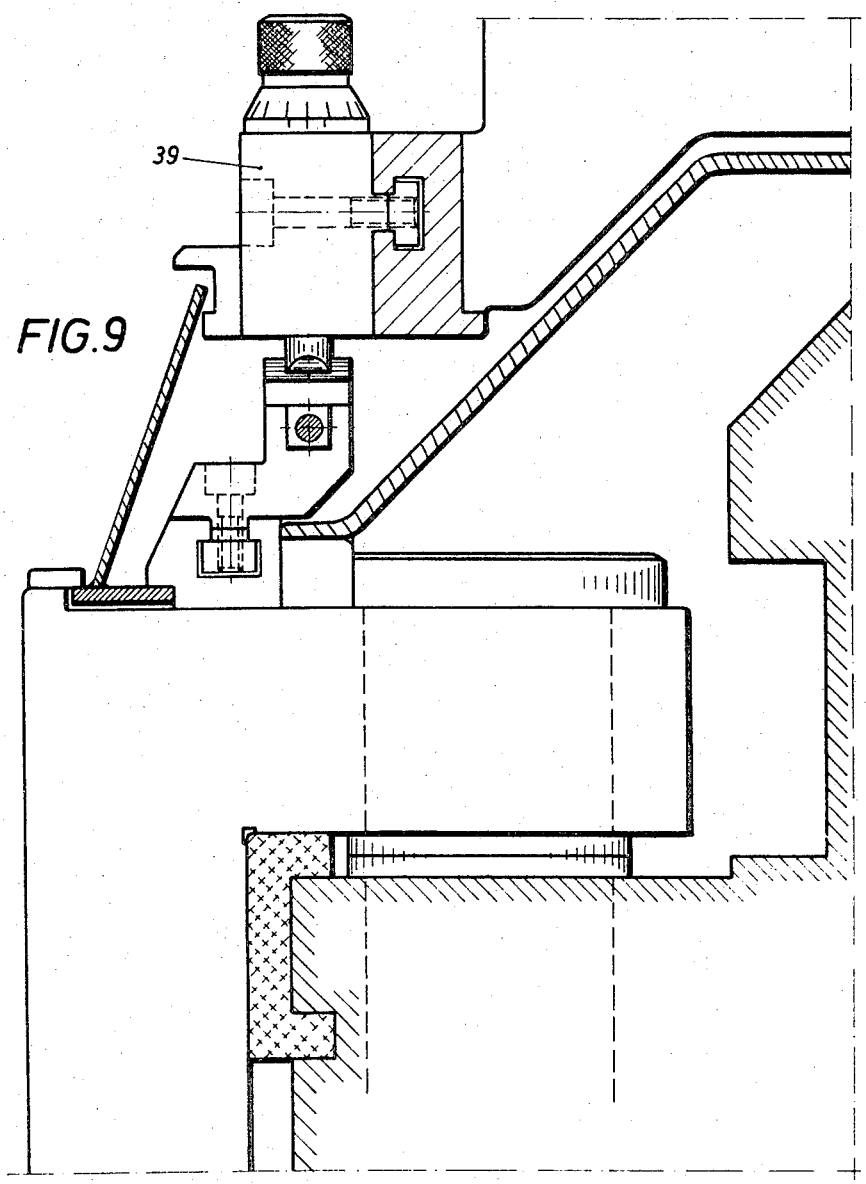
FIG. 9 is a section taken along the line IX—IX of FIG. 8.
Figure 9A:
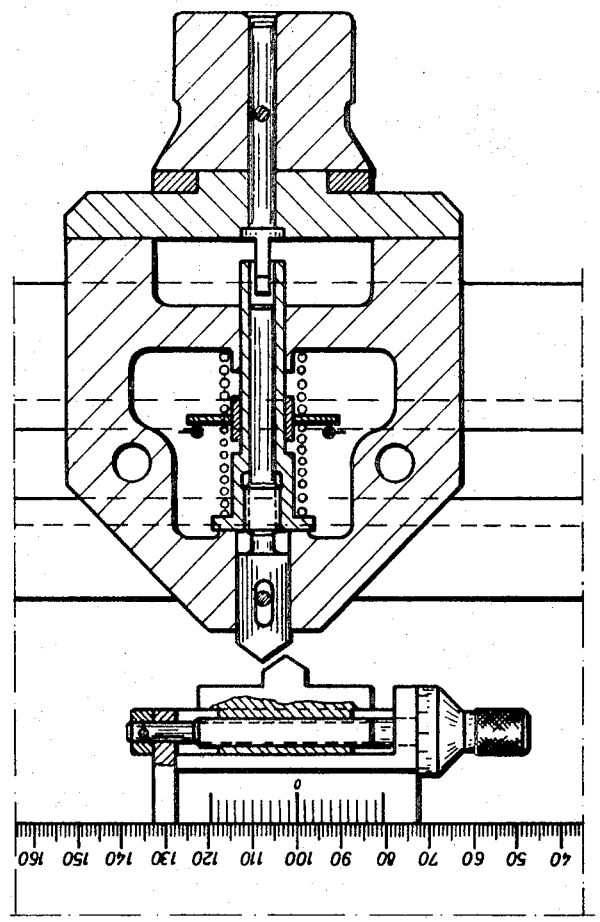
FIG. 9a shows the fine feeling means pertaining to FIG. 9.

The support 1 is thus firmly locked to the carriage 2 which latter is simultaneously firmly clamped onto the guiding means 3 for the carriage. In this position, the electric fine feeler 39 set for a rated value must occupy its freeing or releasing position. The fine feeler 39 is more clearly shown in FIGS. 9 and 9a. When fine feeler 39 has reached its releasing position, the command received during the locking operation can initiate the movement of working units.

If the position of the carriage 2 of the workpiece unit or of the support 1 has changed, for instance, by shocks, heat influence or the like, it will be noted that at a maximum deviation from, for instance, 0.002 millimeters, pulses are conveyed to the control motor 40 (FIG. 5) which control motor through a pair of bevel gears 41 and a pair of spur gears 42 drives a threaded spindle 43 (FIGS. 5 and 3) which is preferably designed as a play-free antifriction bearing spindle. The pulse will be maintained until the rated position has been reached and the releasing command has been given. Simultaneously, with the pulse to the control motor 40, a short time pulse is given to the locking motor 13. As a result thereof, the locking is released to such an extent that the oil pressure drops to a value at which an adjustment of the carriage 2 is still possible.

Simultaneously with the reaching of the releasing or freeing point of the fine feeler 39, the arresting motor 13 is actuated counter-currently until the locking condition has been reestablished.

In the rated position of the support 1 the workpiece 1a is machined by working units 10. After completion of this maching operation, the working units 10 return to their starting position and then emit a command to the workpiece carrier units. In view of this command, the carriage interlock is relieved, and the support 1 is unlocked. After completion of this operation, the driving unit 7 (FIG. 4) with both motors 27 and 28 is turned on (fast traverse motor and feed motor).

The carriers 1 are thereupon by chains 4 moved in the direction toward the following neighborhood stations at fast traverse speed. This movement is, when reaching the approximate position, shifted over by cams 33 and limit switch 34 to a slow operation (FIG. 6). The slow movement is likewise by a similarly mounted fine control cam and limit switch turned off in the locking position. As a result thereof a pulse reaches the locking motor 13 which locks the support 1 and the carriage 2 in the above mentioned manner. The post adjustment may, likewise as described above, be effected at each following station.

The high speed of the carrier locking mechanism may be produced in a simple manner. All important parts are with rational methods representing round bolts and bushings which can be manufactured at high precision. The distances between the bores must be so designed that all bolts can be introduced into the exchangeable bores in said carriers or supports. This problem has been solved according to the present invention by the fact that four out of six bolts are flattened in the manner illustrated in FIG. 10. Then it is merely necessary to carry out two oppositely located bores which are in alignment with each other. It is these bores into which the oppositely located bolts 25 are introduced into corresponding bushings 26. The distances $a$ between the bores must not precisely coincide when producing the carrier 1 and carriage 2. A play $h$ between bolt and bushing, which play is negligible for the receiving precision, permits a spacing tolerance of $2 + (s/2)$ and corresponds approximately 20 times the play $h$.

Also this play can be completely eliminated by having bolts 25 uniformly pressed against abutments 44 (FIG. 6) by means of the equalizing mechanism actuated by the gear rack bolt 24. The inner conical bores provided in bolt 25 are pressed (FIG. 6) against outer cones 45 mounted on the abutment 44.

Since in view of the unavoidable manufacturing tolerances, these conical pairs always rest on a line while the displacement of the bolt becomes effective until all conical pairs are in engagement, in this condition, any play is eliminated.

The equalizing mechanism comprises pinion shafts 46 (FIG. 6) which mesh with corresponding teeth of the bolt 25. Crank heads 47 (FIGS. 3 and 7) with crank pinions 48 are firmly mounted on the bevel shafts 46. Arranged on the crank pins 48 there are rotatably arranged guiding members 49 (FIG. 7) which are longitudinally displaceable in recesses of the guiding members 50.

Gear rack pieces 52 (FIGS. 3 and 7) are arranged at the guiding pieces 50 and on bolts 51 in the manner of a pendulum. The gear rack pieces 52 are in mesh with a flattened gear 53 which is arranged in the manner of a pendulum in the gear rack bolt 24. When bolt 24 is moved upwardly by the pinion shaft 23 (FIG. 3), this movement can be finished only by a uniform pressing on of all bolts 25.

The switch-off command of the limit switch 19 (FIG. 5) will by this mechanically automatic connection of the movement of all six bolts assure the completion of the proper locking operation.

The working unit 10 comprises a frame 54 with rails 57 arranged on the top side, on which rails the horizontal carriage 55 is guided during its feeding movement. On frame 54 there is mounted the stand 61 with the vertical carriage 60, which latter is guided on rails 59 whereby the tool carrier arranged in the vertical carriage 60 is adjustable in vertical direction.

To summarize the operation of an installation according to the present invention, and assuming a plurality of the units arranged in end to end relation, the shifting of the carriages of the respective units between the opposite end positions and to intermediate positions thereof on the respective base, will be accomplished by rotation of screw 43 by the drive motor connected thereto.

Each carriage has an end position where it is immediately adjacent the carriage of the next adjacent unit which has been adjusted into its opposite end position. With the carriages of two adjacent units adjusted into juxtaposed position, the driving of the chains 4 on the carriages in the same direction will be operable to move the work supports thereon toward one end of the carriages.

The work supports have pertaining thereto at the ends the elements 5 and 6 which engage the chains 4 and, when the work support on one carriage is driven to the end of the carriage adjacent a juxtaposed carriage, the leading of the elements 5 and 6, preferably elements 5, will disengage from the respective chains 4 and will engage the chains 4 pertaining to the juxtaposed carriage on the other unit.

The work supports can, in this manner, be transferred from each unit to the unit next adjacent thereto, while at the starting end of the series of units, work member supports can be supplied to the carriage of the first unit and at the finishing end of the series of units the workpiece supports can be removed from the carriage of the final one of the units.

When a work operation has been completed in one station, the work support is unlocked from the carriage and the carriage is unclamped from the base. The carriage is then moved to the end position nearest the unit next to receive the work support while the carriage thereon is moved into juxtaposition with the carriage bearing the work support. The chain on the carriages can then transfer the work support from the first carriage to the next carriage.

After a workpiece support has been transferred to the carriage of a unit, the carriage of the respective unit is brought back to its intermediate position by continuous rotation of screw 43. The carriage is then adjusted into precisely the proper position on the base of the unit to present a workpiece on the workpiece support on the carriage in working position through the influence of the switching arrangement 39 carried by the base of the unit and the feeler pertaining thereto which is mounted on the work support on the carriage. The switching arrangement provides for pulses to the motor driving screw 43 to effect fine adjustment of the carriage position and provides for clamping the carriage to the base when the carriage reaches the proper adjusted position on the base.

Each work support has a fixed locked position on the respective carriage and, accordingly, fine adjustment of the position which the workpiece will occupy during a work operation is accomplished by fine adjustment of the carriage on the respective base.

In the manner described above, workpiece supports can be provided with workpieces to be operated and supplied to a series of units according to the present invention at the first unit of the series and removed from the series when discharged from the final unit of the series, whereupon the completed workpieces can be removed from the workpiece supports and each workpiece support returned to the beginning end of the series of units and supplied with a new workpiece and again passed through the series of units.

It is, of course, to be understood that the present invention is, by no means, limited to the particular showing in the drawings, but also comprises any modifications within the scope of the appended claims.

What is claimed is:

1. A unit adapted for use in a system for performing work operations in succession on work members in successive work stations; said unit having a base, first guide means on the base, a carriage moveable on said first guide means between opposite end positions thereon, second guide means on said carriage parallel to said first guide means, a workpiece support moveable on said second guide means, conveyor means for moving said support on said second guide means, means for adjusting said carriage on said base in a direction parallel to said first guide means, and means for locking said support to said carriage and said carriage to said base, said unit being adapted to present a workpiece mounted on said support in a predetermined position for a work operation.

2. A unit according to claim 1 which includes two of said units arranged with said second guide means in aligned relation and so spaced that the carriages thereof are in end to end relation in the respective end position thereof nearest each other whereby a workpiece support on one thereof can be transferred to the other thereof by said conveyor means.

3. A unit according to claim 1 which includes first locating means for locating said support in said working position on said carriage, second locating means for locating said carriage in said working position on said base, said conveyor means being carried by said carriage.

4. A unit according to claim 1 in which said conveyor means is in the form of endless chain means on said carriage, and drive means for said chain means.

5. A unit according to claim 4 which includes first follower means, at one end of said support engageable with said chain means, second follower means at the other end of said support engageable with said chain means, said second follower means being adapted to disengage from the chain means of the carriage supporting said support and to engage the chain means on the carriage of the next adjacent unit when said carriages are in juxtaposition and the chain means on the respective carriages run in the direction from said one end of said support to the said other end thereof.

6. A unit according to claim 4 in which said drive means includes motor means for driving said chain means at high speed for traverse movements and at slow speed for final positioning movements.

7. A unit according to claim 6 in which said drive means is mounted on said carriage at one end thereof.

8. A unit according to claim 4 in which said chain means comprises a pair of chains spaced laterally in said carriage, a sprocket engaged by each said chain, drive motor means for driving said sprockets, and a differential gear transmission having an input element driven by said motor means and an output element connected to each said sprocket, said drive motor means driving said input element at a higher speed or a lower speed.

9. A unit according to claim 8 in which said differential gear transmission is operable to impose equal driving stresses on said chains and to compensate for differences in length of said chains.

10. A unit according to claim 6 which includes control means for said motor means, said control means comprising limit switch means on one of said carriage and support and limit switch actuating means on the other thereof.

11. A unit according to claim 1 which includes bolts reciprocable in said carriage and bores in said support to receive said bolts and registering with said bolts when said support is in said working position thereon on said carriage, and means for actuating said bolts into and out of said bores.

12. A unit according to claim 1 which includes a locking motor on said carriage, locking bolts in said carriage reciprocable into and out of corresponding bores in said support, fluid operable clamping means responsive to fluid pressure to clamp the carriage to the base, a transmission connecting said bolts with said motor and including a traveling worm which is shiftable in one direction when said bolts are seated in said bores, and means operated by shifting of said worm in said one direction for supplying fluid under pressure to said clamping means.

13. A unit according to claim 10 in which said limit switch means includes a first limit switch engaged by said actuating means as said support approaches said working position on said carriage and operable to cause said motor means to drive said chain means at slower speed and a second limit switch engageable by said actuating means when said support reaches said working position on said carriage and operable to cause said motor means to halt said chain means.

14. A unit according to claim 12 in which said clamping means comprises clamp plates loosely mounted on said carriage and guide strips on said base on which the carriage rests and confined between said carriage and said plates and expansible fluid motors between said carriage and clamp plates operable upon expansion thereof to press said clamp plates toward said guide strips and clamp said carriage to said guide strips.

15. A unit according to claim 12 in which there are six said locking bolts in said carriage, two pairs of said locking bolts being moveable laterally in the carriage into lateral bores in said support and a third pair of said locking bolts being moveable vertically in the carriage into vertical bores in said support.

16. A unit according to claim 15 in which some of said bolts are relieved on the sides on the ends nearest the said support.

17. A unit according to claim 15 which includes equalizing means connecting the bolts of each pair with said locking motor.

18. A unit according to claim 15 in which at least some of said bores have abutment means therein disposed near the outer ends of the respective bolts when the bolts are disposed therein, and cooperating elements of a tapered pin and tapered socket alignment system on said abutment means and on the outer ends of the pertaining bolts interengageable when said bolts are pushed into said bores by said locking motor.

19. A unit according to claim 17 in which said equalizing means comprises a plunger driven by said locking motor, a gear rotatable on the plunger, racks meshing with diametrically opposite sides of said gear, a yoke pivoted in the center to each rack and having slotted ends, shoes in the slotted ends of each yoke, shafts connected to said shoes to be rotated thereby, a gear on each shaft, and each gear meshing with a rack portion formed on a respective locking bolt.

20. A unit according to claim 6 which includes a locking motor for actuating said locking and clamping means and an adjusting motor for effecting said fine adjustment of the position of said carriage, said locking and adjusting motors being supported by said carriage at the end thereof opposite said drive means.

21. A unit according to claim 1 which includes an adjusting motor for effecting said fine adjustment of the position of said carriage, and control means for said adjusting motor comprising a switch and a switch actuating feeler, one of said switch and feeler being mounted on said support and the other being mounted on said base and being in proximity when both of said support and carriage are in working position.

22. A unit according to claim 21 in which said fine adjustment of said carriage is in a direction parallel to said first guide means, and means operable during control of said adjusting motor by said switch means for unclamping said carriage from said base.

23. A unit according to claim 22 in which said switch when actuated causes a supply of pulses to said adjusting motor and also effects control of said locking motor so as to unclamp said carriage from said base during operation of said adjusting motor, a screw extending longitudinally of said carriage and connected to said adjusting motor, and a play-free nut on said base into which said screw is threaded.

24. A unit according to claim 23 in which said adjusting motor is made idle and said locking motor is actuated to clamp said carriage to said base when said switch and feeler are in a predetermined position.

25. A unit according to claim 1 in which a working device is provided adjacent said unit and having a tool spindle for supporting a tool to perform work operations on a work member on said support, said device comprising carriage means supporting said spindle for adjustment thereof in horizontal and vertical directions.

26. In an installation having a plurality of work stations in a line; means for moving workpieces from work station to work station, said means comprising a line of units, one at each station, and each having a base with first guide means thereon parallel to the line of work stations, a carriage moveable between opposite end positions on each base, second guide means on each carriage parallel to said first guide means and all thereof being aligned, the carriages on adjacent units being in adjacent relation when each thereof is moved to the end position on the respective base nearest the base of the other unit, conveyor means on each said carriage running from one end to the other thereof aligned with each other and parallel to said guide means, and at least one workpiece support adapted for slidable engagement with said second guide means and including conveyor means engaging elements at the opposite ends, said elements engaging the conveyor means of the carriage on which the respective work support is disposed and disengaging therefrom when the pertaining end of the support is moved past an end of the carriage and engaging the conveyor means on another carriage juxtaposed to said end of the first mentioned carriage whereby a workpiece support can be transferred from carriage to carriage in succession along said line of units.

27. An installation according to claim 26 which includes means for moving each carriage to an intermediate position on the respective base following the transfer of a work support thereto and for causing the respective conveyor means to move the work support thereon to an intermediate position on the said carriage, means to lock the workpiece support to the carriage in a fixed intermediate position thereon, cooperating elements of a feeler means on said base and said support positioned to be in cooperative relation when said support is in said fixed intermediate position on said carriage and said carriage is in the said intermediate position thereof on said base, means under the control of said feeler means to adjust the position of said carriage on said base to locate said support in a predetermined working position on said base, and means for clamping the carriage to the base in adjusted positions thereon.

* * * * *